United States Patent
Walker et al.

(10) Patent No.: US 6,728,823 B1
(45) Date of Patent: Apr. 27, 2004

(54) CACHE CONNECTION WITH BYPASSING FEATURE

(75) Inventors: Shawn Kenneth Walker, Fort Collins, CO (US); Terry L Lyon, Fort Collins, CO (US); Blaine Stackhouse, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,203

(22) Filed: Feb. 18, 2000

(51) Int. Cl.$^7$ ............................................. G06F 13/14
(52) U.S. Cl. .................. 710/315; 710/310; 710/100; 710/29; 710/33; 711/117; 711/119; 711/120; 711/138; 709/213
(58) Field of Search .................. 710/305, 100, 710/33, 29, 66, 35, 3, 107, 118, 133, 154, 122, 157, 143, 138, 310; 700/17; 709/213; 711/117, 120, 119, 138

(56) References Cited

U.S. PATENT DOCUMENTS

| | | | | |
|---|---|---|---|---|
| 3,618,041 A | * | 11/1971 | Horikoshi | 711/154 |
| 3,771,137 A | * | 11/1973 | Barner et al. | 711/120 |
| 3,820,078 A | * | 6/1974 | Curley et al. | 711/118 |
| 3,840,863 A | * | 10/1974 | Fuqua et al. | 711/3 |
| 4,245,344 A | * | 1/1981 | Richter | 714/43 |
| 4,268,907 A | * | 5/1981 | Porter et al. | 711/138 |
| 4,464,717 A | * | 8/1984 | Keeley et al. | 711/122 |
| 4,533,995 A | * | 8/1985 | Christian et al. | 711/122 |
| 4,737,931 A | * | 4/1988 | Ishii | 711/157 |
| 4,825,357 A | * | 4/1989 | Ovies et al. | 710/29 |
| 4,905,141 A | * | 2/1990 | Brenza | 711/129 |
| 5,202,969 A | * | 4/1993 | Sato et al. | 711/143 |
| 5,253,352 A | * | 10/1993 | Olson | 710/29 |
| 5,327,570 A | * | 7/1994 | Foster et al. | 712/30 |
| 5,454,093 A | * | 9/1995 | Abdulhafiz et al. | 711/133 |
| 5,721,957 A | * | 2/1998 | Huang et al. | 710/66 |
| 5,859,999 A | | 1/1999 | Morris et al. | 395/565 |
| 5,860,017 A | | 1/1999 | Sharangpani et al. | 395/800.23 |
| 5,918,072 A | * | 6/1999 | Bhattacharya | 710/29 |
| 6,330,591 B1 | * | 12/2001 | Ducaroir et al. | 709/213 |
| 6,349,360 B1 | * | 2/2002 | Arimilli et al. | 710/33 |
| 6,430,679 B1 | * | 8/2002 | Heeb | 712/218 |
| 6,434,665 B1 | * | 8/2002 | Shepherd et al. | 711/118 |
| 6,598,140 B1 | * | 7/2003 | McAllister et al. | 711/168 |
| 6,617,879 B1 | * | 9/2003 | Chung | 326/82 |
| 6,633,947 B1 | * | 10/2003 | Holman et al. | 711/5 |
| 6,636,939 B1 | * | 10/2003 | George | 711/111 |
| 6,651,143 B2 | * | 11/2003 | Mounes-Toussi | 711/138 |

FOREIGN PATENT DOCUMENTS

EP 0375864 A2 7/1990

OTHER PUBLICATIONS

M. Morris Mano, Computer System Architecture, Prentice-Hall Inc., Second Edition, pp. 22, 266–267.*

Wolfe, A., "Patents shed light on Merced's Innards", Electronic Engineering Times, Feb. 15, 1999.

* cited by examiner

Primary Examiner—Xuan M. Thai
Assistant Examiner—Justin King

(57) ABSTRACT

A source cache transfers data to an intermediate cache along a data connection. The intermediate cache is provided between the source cache and a target, and includes a memory array. The source cache may also transfer data to the target along the data connection while bypassing the memory array of the intermediate cache.

24 Claims, 2 Drawing Sheets

CACHE CONNECTION WITH BYPASSING FEATURE

TECHNICAL FIELD

The invention relates to computer memory systems. More particularly, the invention relates to multilevel cache memories.

BACKGROUND ART

In a computer system, the interface between a processor and memory is critically important to the performance of the system. Because fast memory is very expensive, memory in the amount needed to support a processor is generally much slower than the processor. In order to bridge the gap between fast processor cycle times and slow memory access times, cache memory is utilized. A cache is a small amount of very fast memory that is used to store a copy of frequently accessed data and instructions from main memory. A processor can operate out of this very fast memory and thereby reduce the number of wait states that must be interposed during memory accesses. When the processor requests data from memory and the data resides in the cache, then a cache read "hit" takes place, and the data from the memory access can be returned to the processor from the cache without incurring the latency penalty of accessing main memory. If the data is not in the cache, then a cache read "miss" takes place, and the memory request is forwarded to the main memory, as would normally be done if the cache did not exist. On a cache miss, the data that is retrieved from the main memory is provided to the processor and is also written into the cache due to the statistical likelihood that this data will be requested again by the processor in the near future.

The individual data elements stored in a cache memory are referred to as "lines." Each line of a cache is meant to correspond to one addressable unit of data in the main memory. A cache line thus comprises data and is associated with a main memory address in some way. Schemes for associating a main memory address with a line of cache data include direct mapping, full association and set association, all of which are well known in the art.

A cache may be designed independently of the microprocessor, in which case the cache is placed on the local bus of the microprocessor and interfaced between the processor and the system bus during the design of the computer system. However, as the density of transistors on a processor chip has increased, processors may be designed with one or more internal caches in order to decrease further memory access times. An internal cache is generally small, an exemplary size being 256 Kb (262,144 bytes) in size. In computer systems that utilize processors with one or more internal caches, an external cache is often added to the system to further improve memory access time. The external cache is generally much larger than the internal cache(s), and, when used in conjunction with the internal cache(s), provides a greater overall hit rate than the internal cache(s) would provide alone.

In systems that incorporate multiple levels of caches, when the processor requests data from memory, the internal or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory (or higher levels of caches, if present). Write operations are similar, with mixing and matching of the operations discussed above being possible.

In a multilevel cache system several forms of data transfer can take place. The possible data transfers include fills, loads, and stores. As used herein, a fill operation is the copying of a line from a higher level cache (further from a processor core) into a lower level cache (closer to a processor core); a load operation is the copying of at least a part of a line from a cache into the processor core—typically a register or general register file within the processor core; and a store operation is the moving of data from the processor core into a line of a cache. These data transfers are better understood by considering FIG. 1.

FIG. 1 is a block diagram of a computer system 100 with two levels of caches. A processor core 105 is connected to an L0 cache 110 and an L1 cache 115. The L1 cache 115 and the L0 cache 110 are solid state memory circuits. The L1 cache 115, the L0 cache 110 and the processor core may be separate integrated circuits or physically packaged together in some combination (e.g., the L0 cache 110 and the processor core 105 together in the same integrated circuit package). The L0 cache 110 comprises a memory array 140, which is a RAM (random access memory) where cache lines are stored.

Several buses connect among the processor core 105, the L0 cache 110 and the L1 cache 115. An L1 load bus 125 is a bus for loading data from the L1 cache 115 to the microprocessor core 105. An L0 load bus 130 is a bus for loading data from the L0 cache 110 to the microprocessor core 105. A store bus 135 supports storing operations from the microprocessor core 105 to the L0 cache 110 and/or the L1 cache 115. Finally, a fill bus 120 supports transfers of lines from the L1 cache 115 to the L0 cache 110. Because fills are larger than stores (or loads), fill data on the fill bus 120 is split into several sections, and each section is connected to a separate input port on the memory array 140. The widths of the fill bus 120 is L bytes, while the width of the other buses is K bytes. As shown, L=4K with exemplary values being L=64 bytes and K=16 bytes.

SUMMARY OF THE INVENTION

In one respect, the invention is a method for using a data connection between a source and a cache. The cache comprises a memory array, and the cache is intermediate between the source and a target. The method comprises transferring data from the source to the cache along the data connection and transferring data from the source to the target along the data connection while bypassing the memory array. Preferably, the target is a processor core, and the cache is a level 0 cache with respect to the processor core. Alternatively, the target is a second cache. Preferably, the data connection is a bus, and in some cases the width of the data connection bus may be less than the width of a cache line in the memory array.

In another respect, the invention is an apparatus for conveying data from a source to at least one of a plurality of targets. The apparatus comprises a cache that is a first target, a second target, a first data connection and a second data connection. The cache comprises a memory array. The first data connection extends from the source to the cache, wherein data targeted at the cache is conveyed along the first data connection and wherein data targeted at the second target is conveyed along the first data connection while bypassing the memory array. The second data connection extends from the cache to the second target, wherein data targeted at the second target is conveyed along the second data connection. The source of the data targeted at the second target may be the cache or the source. Preferably, the second target is a processor core, and the cache is a level 0 cache with respect to the processor core. Alternatively, the second target is a second cache. Preferably, the first data connection and the second data connection are buses, and in some cases the width of the data connection buses may be less than the width of a cache line in the memory array.

In yet another respect, the invention is an apparatus. The apparatus comprises a memory array having an interface port, a first connection selectively coupled to the interface port, and a second connection selectively coupled to the interface port. Preferably, the first connection comprises a first tri-state buffer capable of driving signals from a first source to the interface port, and the second connection comprises a second tri-state buffer capable of driving signals from a second source to the interface port. The first source may be a lower level cache memory with respect to the memory array, which itself may be a cache, and the second source is a processor core. As a further option, the apparatus could include latches connected between the source and the respective tri-state buffers.

DETAILED DESCRIPTION OF A PREFERRED EMBODIMENT

Figure 1:
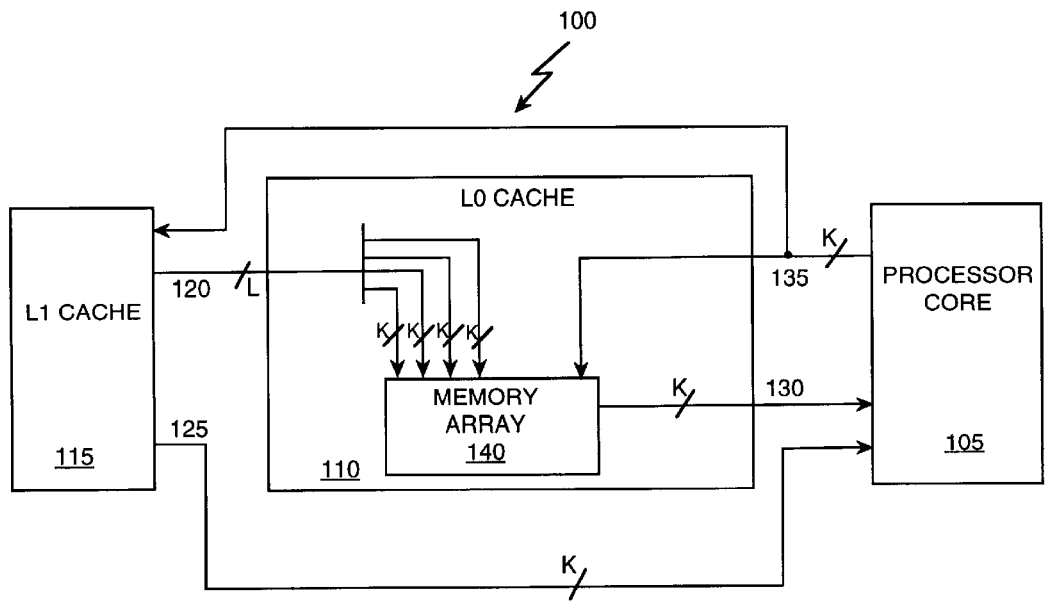
FIG. 1 is a block diagram of a computer system with two levels of caches.
Figure 2:
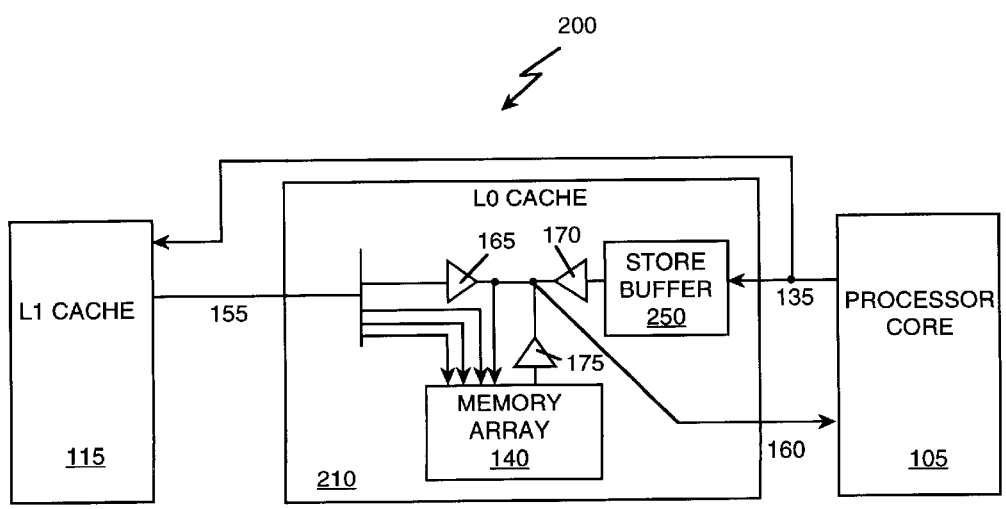
FIG. 2 is a block diagram of a computer system with two levels of caches, according to one embodiment of the invention.

FIG. 2 is a block diagram of a computer system 200 with two levels of caches, according to one embodiment of the invention. The computer system 200 is like the computer system 100 illustrated in FIG. 1 in that the computer system 200 comprises the processor core 105, the L1 cache 115 and an L0 cache 210, which is similar for the most part to the L0 cache 110. However, the computer system 200 is an improvement over the computer system 100 in several respects. First, the L1 load bus 125 is eliminated, resulting in a significant savings in wiring. Second, the number of ports on the processor core 105 is reduced from three to two. Third, the number of write ports on the memory array 140 is reduced from five to four.

In the computer system 200, a single bus—an L1 load/fill bus 155—performs the same functions as both the fill bus 120 and the L1 load bus 125 in the computer system 100 (FIG. 1). Because fills are larger than loads, the L1 load/fill bus 155 diverges into different sections, all of which are used for fills and only one of which is used for loads. Four buses diverge from the L1 load/fill bus 155. The bottom three, as shown, are fill only buses. The top one, as shown, is a combination fill/load (and store) bus. In one embodiment, the widths of the four buses split from the L1 load/fill bus 155 are equal, though that is not always necessary. Those skilled in the art will surely appreciate the various possibilities in terms of the number of sub-buses and their sizes. If the widths of the L1 load/fill bus 155 and ports on the memory array 140 are the same, then splitting is not necessary at all.

During a fill operation, the entire width of the L1 load/fill bus 155 and all four split sub-buses are utilized. During a load operation, only one section of the L1 load/fill bus 155 is utilized. That is, three (the bottom three as shown) of the four split sub-buses are fill-only buses, whereas one (the top) is a dual load/fill bus. During either a fill or a load operation, a tri-state buffer 165 is driving, so that data is written to the memory array 140 (if enabled) or written to the processor core 105 (if enabled) via the L1/L0 load bus 160 or both. When the tri-state buffer 165 is driving, tri-state buffers 170 and 175 are not driving. When cache lines are read from the memory array 140 and loaded into the processor core 105, the tri-state buffer 175 is driving and the tri-state buffers 165 and 170 are not driving. When data from the processor core 105 are written to the memory array 140, the tri-state buffer 170 is driving and the tri-state buffers 165 and 175 are not driving.

The computer system 200 also comprises a store buffer 250, which is connected between the store bus 135 and the memory array 140. The store buffer 250 temporarily buffers data on the store bus 135 until the data can be written at a convenient time, thus freeing the processor core 105 to continue execution without having to stall while waiting to write the memory array 140.

In the computer system 200, a single port to the memory array 140 is utilized for both fill operations and store operations. This single port is the input port connected to the tri-state buffers 165 and 170. Indeed, the node between the tri-state buffers 165 and 170 is a combined fill/load/store bus node. The tri-state buffers 165, 170 and 175 are means for sharing a bus node, in particular the combined fill/load/store bus node to which each of the tri-state buffers 165, 170 and 175 are directed. Those skilled in the art will appreciate that other means for sharing a bus node can be used in place of the tri-state buffers 165, 170 and 175. For example, a three-to-one multiplexor could be utilized so that the load/fill/store node can be selectively driven by either the top section of the L1 load/fill bus 155, the store bus 135 or the bus output from the memory array 140.

In a preferred form of the illustrated embodiment, the width of the L1 load/fill bus 155 is L bytes and the width of all other buses is K bytes, where L=4K. Each of the three dedicated fill sub-buses need only index to a fixed fourth-of-K offset into the memory array 140. However, the memory port connected to the combined fill/load/store bus must be capable of indexing to any K-byte section of a cache line in the memory array 140, because store operations generally require such flexibility.

The processor core 105 is preferably a general purpose microprocessor but may also be a special purpose processor, such as a digital signal processor, or a microcontroller. In one arrangement, the L0 cache 210 and the processor core 105 are packaged together on the same integrated circuit, and the L1 cache can be a part of the same integrated circuit or on another, separate integrated circuit. The L1 cache 115 may be replaced with a main memory or data bus, and the invention is equally useful. In any case, the L1 cache 115 or a main memory or data bus in its place is a source of data, and an advantage of the invention is that data is transferred from the source to a plurality of targets efficiently with less wiring. In another alternative arrangement, the processor core 105 could be replaced by another, lower level cache.

Figure 3:
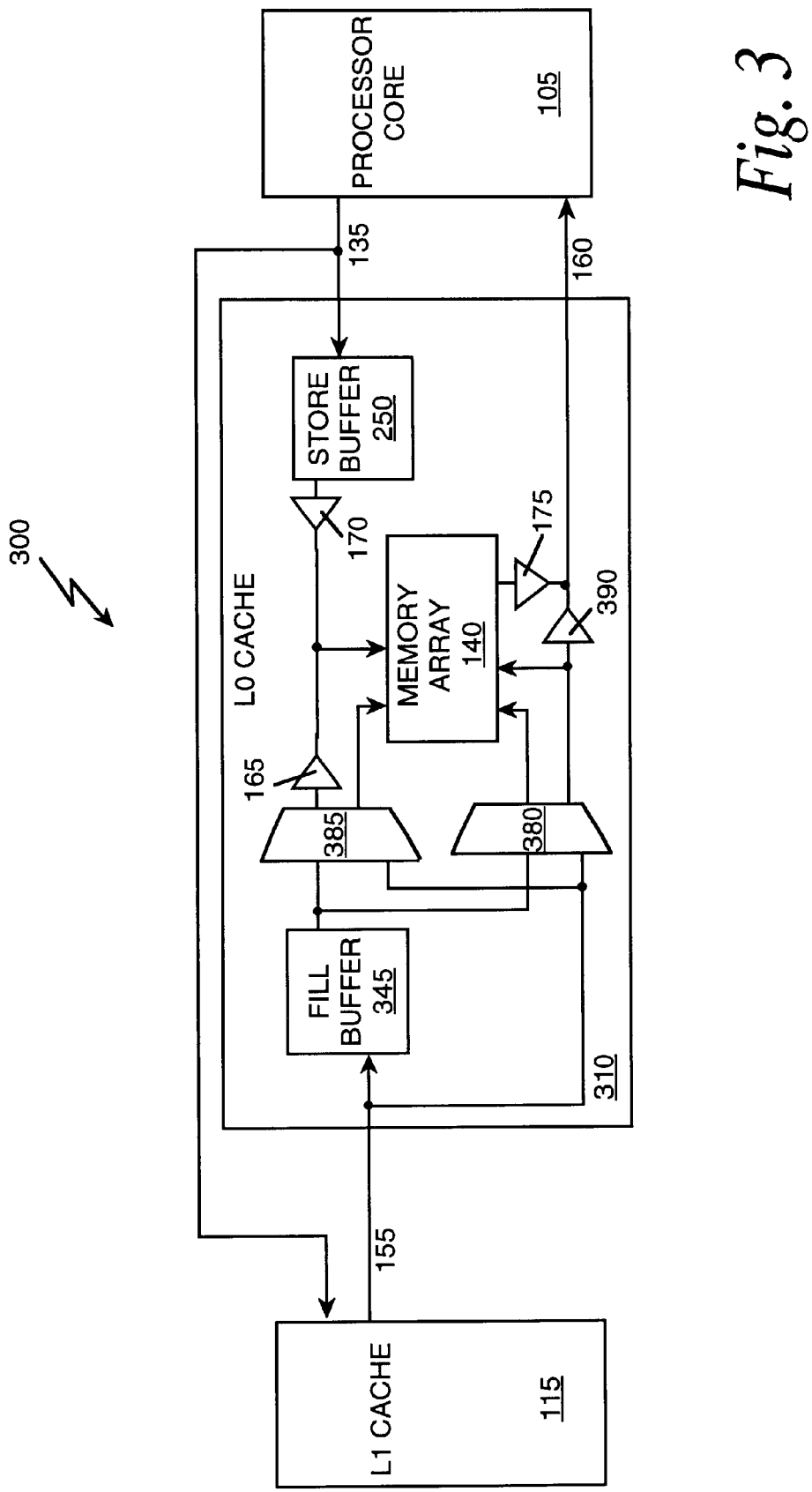
FIG. 3 is a block diagram of a computer system with two levels of caches, according to another embodiment of the invention.

Another embodiment of the invention is illustrated in FIG. 3, which is a block diagram of a computer system 300 with two levels of caches. Like the computer system 200, the computer system 300 comprises the L1 cache 115 and the processor core 105. However, the computer system 300 comprises an L0 cache 310 that is different from the L0 cache 210. The L0 cache 310 is operable when the width of the L1 load/fill bus 155 is less than the size of cache lines in the memory array 140. Preferably, the difference in size is a factor of two. For example, the width of the L1 load/fill bus 155 in the computer system 300 may be M=L/2, while the width of a cache line in the memory array 140 is L bytes. To fill an entire cache line, fill data is sent to the L0 caches in two transfer cycles. A first "chunk" of the fill data is sent during the first transfer cycle on the L1 load/fill bus 155; a second "chunk" is sent during a subsequent, second transfer cycle on the L1 load/fill bus 155.

Because the width of the L1 load/fill bus 155 in the computer system 300 is only half of that in the computer system 200 (FIG. 2), a fill buffer 345 latches and holds chunks from the L1 load/fill bus 155. The output of the fill buffer 345 is input as one of two inputs to multiplexors 380 and 385. The other input to the multiplexors 380 and 385 is connected directly to the L1 load/fill bus 155. Thus, two successive chunks are always input to the multiplexors 380 and 385—a chunk from the L1 load/fill bus 155 and the immediately previous chunk latched in the fill buffer 345. Each of the multiplexors 380 and 385 selects one of its two input chunks and splits the selected chunk onto its two output buses connected to input ports of the memory array 140. Thus, four input buses are interfaced to the memory array 140 in the computer system 300, just as in the computer system 200. Preferably, the widths of these four buses are equal (say K, where K=M/2=L/4). During a fill operation, the first chunk is latched in the fill buffer 345 and then provided as the top inputs to the multiplexors 380 and 385 while the second chunk is provided to the bottom inputs of to the multiplexors 380 and 385, as shown. The multiplexor 385 is configured such that its outputs write the upper half of a cache line in the memory array 140, and the multiplexor 380 is configured such that it writes the lower half of a cache line in the memory array 140. A particular half-indicating bit is provided, and the multiplexors 380 and 385 sense the half-indicating bit to determine which input to select. In one embodiment, the half-indicating bit is in the second chunk, but the half-indicating bit could be in either or both chunks.

During a load operation, the first chunk always contains load data for the processor core 105, and the multiplexer 380 is configured to select its bottom input, as shown. In this way, load data can be supplied to the processor core 105 without incurring the delay of the fill buffer 345. The load data is provided in the section of the word on the L1 load/fill bus 155 that is output from the bottom output of the multiplexor 380, as shown. During a load, a tri-state buffer 390 drives the L1/L0 load bus 160. Thus, L1 loads bypass the memory array 140 in the computer system 300, just as in the computer system 200 (FIG. 2). When the L1/L0 load bus 160 is utilized in its other capacity for loads from the L0 cache 310, the tri-state buffer 390 is not driving and the tri-state buffer 175 is driving. During a load operation, the configuration of the multiplexor 385 is immaterial (i.e., in a "don't care" state).

Optionally, the top output bus from the multiplexor 380 can also be a dual use bus, rather than a fill only bus. In this optional arrangement, the top bus from the multiplexor 380 would be connected to the memory array 140 and a second L1/L0 load bus connected to the processor core 105 in the same manner as the bottom bus (i.e., with two tri-state buffers like the tri-state buffers 175 and 390). The optional arrangement permits double loads from either the L1 cache 115 or the L0 cache 310 or simultaneous loads from both.

The L0 cache 310 utilizes a combined fill/store port to the memory array 140. This input port to the memory array 140 is driven by either the tri-state buffer 165 (during fills) or the tri-state buffer 170 (during stores). For flexibility in storing, this input port is capable of indexing to any one-fourth section of a cache line in the memory array 140, as described above. Optionally, the bottom output from the multiplexor 385 can be a combined fill/store port, rather than a dedicated fill port. To accomplish this, the bottom output from the multiplexor 385 would be connected to the memory array 140 and a store buffer (separate from the store buffer 250 or integrated with it), which in turn is connected to the processor core 105, in the same manner as the top output from the multiplexor 385 (i.e., with two tri-state buffers like the tri-state buffers 165 and 170). This optional arrangement permits double stores without requiring another port on the memory array 140.

The terms and descriptions used herein are set forth by way of illustration only and are not meant as limitations. For example, any number of bus nodes and/or memory array ports can be consolidated according to the principles of the present invention. Those skilled in the art will recognize that this and many other variations are possible within the spirit and scope of the invention as defined in the following claims, and their equivalents, in which all terms and phrases are to be understood in their broadest reasonable sense.

What is claimed is:

1. A method for using a data connection between a source cache and an intermediate cache, wherein the intermediate cache comprises a memory array, and wherein the intermediate cache is intermediate between the source cache and a target, the method comprising:

transferring data from the source cache to the intermediate cache along the data connection, wherein the data connection comprises a bus partitioned into a plurality of subbuses; and transferring data from the source cache to the target along a subbus of the plurality of subbusses while bypassing the memory array.

2. The method of claim 1 wherein the target is a processor core.

3. The method of claim 2 wherein the intermediate cache is a level 0 cache with respect to the processor core.

4. The method of claim 1 wherein the target is another cache.

5. The method of claim 4 wherein the target is a lower level cache in a multilevel cache system.

6. The method of claim 1 wherein the plurality of subbuses have substantially the same width.

7. The method of claim 1 wherein the width of the bus is less than the width of a cache line in the memory array.

8. The method of claim 1 further comprising:

buffering data on the data connection.

9. The apparatus of claim 1, wherein data is transmitted from the source to the target to perform a load operation.

10. The apparatus of claim 1, wherein multiple subbuses of the plurality of subbusses are used to transmit data from the source to the memory array.

11. The apparatus of claim 10, wherein data is transmitted from the source cache to the memory array to perform a fill operation.

12. An apparatus for conveying data from a source to at least one of a plurality of targets, the apparatus comprising:

a cache, wherein the cache is a first target, and wherein the cache comprises a memory array;

a second target;

a first data connection extending from the source to the cache, wherein the first data connection comprises a bus partitioned into a plurality of subbuses and data targeted at the cache is conveyed along the first data connection and wherein data targeted at the second target is conveyed along a subbus of the plurality of subbuses while bypassing the memory array; and a second data connection extending from the cache to the second target, wherein data targeted at the second target is conveyed along the second data connection.

13. The apparatus of claim 12 wherein the second target is selected from the group consisting of a processor core and a cache.

14. The apparatus of claim 12 wherein the first data connection and the second data connection comprise one or more busses.

15. The apparatus of claim 12 wherein the cache comprises:

a first tri-state buffer on the first data connection.

16. The apparatus of claim 15 wherein the cache further comprises:

a second tri-state buffer connected from the memory array to the second data connection.

17. The apparatus of claim 16 wherein the first tri-state buffer is in a driving state when data is being transferred from the source to the memory array or the second target, and wherein the second tri-state buffer is in a driving state when data is being transferred from the memory array to the second target.

18. The apparatus of claim 12 wherein the cache further comprises:

a latch on the first data connection.

19. The apparatus of claim 12 wherein the source of data targeted at the second target is selected from the group consisting of a memory unit and an upper level cache.

20. An apparatus comprising:

a source cache means for caching data;

an intermediate cache means for caching data and comprising a memory array, wherein the intermediate cache means is intermediate between the source cache means and a target;

partitioned data transfer means for transferring data from the source cache means to the intermediate cache means, wherein the partitioned data transfer means is partitioned into a plurality of sub-partitioned data transfer means; and a sub-partitioned data transfer means of the plurality of sub-partitioned data transfer means for transferring data from the source cache means to the target while bypassing the memory array.

21. The apparatus of claim 20, wherein the target comprises processor means for processing data from at least one of the source cache means and the intermediate cache means.

22. The apparatus of claim 20, wherein the target comprises another cache means for caching data.

23. The apparatus of claim 20, further comprising means for buffering data transferred from the target to the memory array.

24. The apparatus of claim 20, wherein the partitioned data transfer means comprises at least two multiplexing means for multiplexing data transmitted to the memory array.

* * * * *